United States Patent Office 3,350,622
Patented Oct. 31, 1967

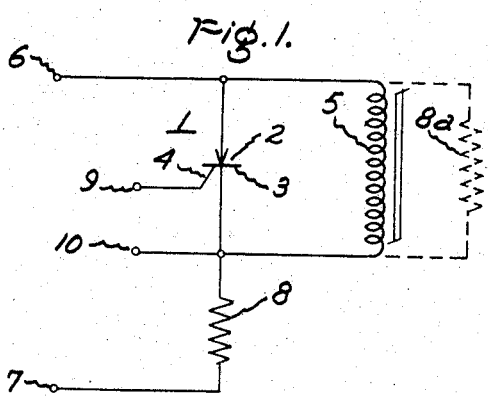
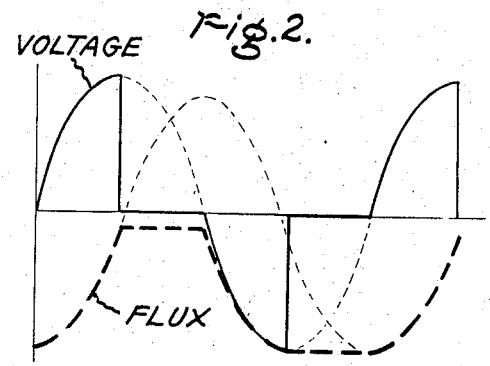
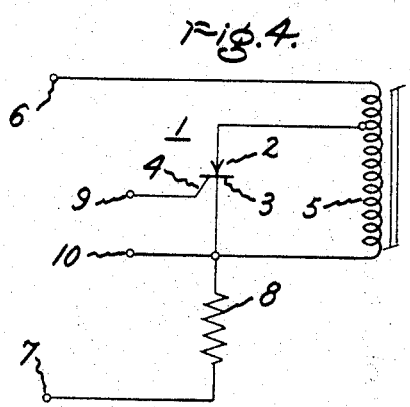
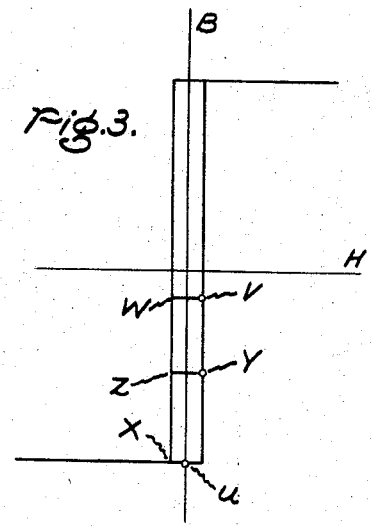
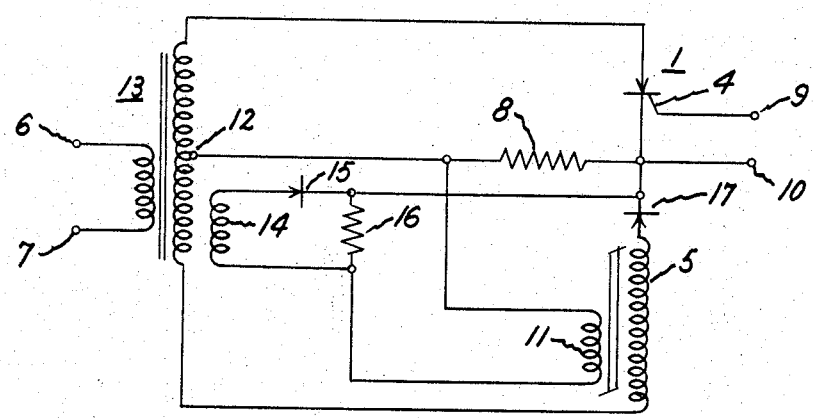
Inventor:
Harold W. Lord,
by John P. Dellitt
His Attorney.

3,350,622
CONVERTER UTILIZING A SATURABLE REACTOR SLAVED WITH A SILICON CONTROLLED RECTIFIER
Harold W. Lord, Schenectady, N.Y., assignor to General Electric Company, a corporation of New York
Filed Dec. 11, 1962, Ser. No. 243,832
1 Claim. (Cl. 321—8)

This application relates to a control circuit for providing full wave current control in response to a half wave control signal and more particularly to such a circuit having the advantage of rapid response time.

In my patent, 2,937,331, there is disclosed and claimed a magnetic amplifier circuit for delivering a full wave output to a load in response to a half wave control signal. In accordance with the circuit of that patent a half wave magnetic amplifier has associated therewith a saturating reactor operating in "slaved" relation to the magnetic amplifier reactor. While the magnetic amplifier reactor is phase controlled to operate or "fire" at selected phase angles on half cycles of a given polarity, the saturating reactor is effective to fire at similar phase angles for opposite polarity half cycles. The "slaved" action is accomplished because the flux in the slaved reactor is reset during the half cycles or portions thereof when the magnetic amplifier reactor operates to absorb the applied voltage and so allows only its exciting current to flow through the load. There is thereby provided a full wave controlled output current in response to a half wave control signal.

While very useful in many respects, the foregoing circuit is not immediately responsive to changes in input signal. Although the circuit responds within one half cycle to the occurrence of a control signal in the turn-on direction, the response in the turn-off direction is slower. Several cycles at the power supply frequency may be required to reach cutoff from the full "on" condition. The reason for the longer delay in this direction is that firing of the saturating reactor exerts a loading effect upon the resetting of the magnetic amplifier reactor. The core flux in the magnetic amplifier reactor cannot be completely reset if the saturating reactor core is saturated for all or a substantial part of the half cycle in which the control signal normally is effecting reset.

It is therefore an object of the present invention to provide a full wave control circuit responsive to a half wave control signal wherein the turn-off time is comparable to the turn-on time.

Briefly stated, in accordance with an embodiment of the present invention, a saturating reactor has associated therewith a unilateral conductor capable of phase control, for example, a silicon-controlled rectifier. The silicon-controlled rectifier has its principal electrodes disposed in parallel with at least a substantial portion of the winding of the saturating reactor. The unilateral conductor is provided with a control element whereby it may be "fired" to conduct at selected phase angles during half cycles of input alternating voltage appropriate for conduction through the unilateral conductor. The forward voltage appearing across the unilateral conductor when the firing angle is delayed is used for resetting the flux in the saturating reactor whereby the saturating reactor "fires" at an equivalent phase angle on the alternate half cycle. The unilateral conductor and the saturating reactor are arranged to supply the same load which therefore receives a full wave symmetrical output in response to the half wave control signal. Since no resetting problems attend the operation of the unilateral conductor, response time in the turn-off direction is comparable to that in the turn-on direction, e.g. as fast as one half cycle at the input frequency.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic diagram of a preferred embodiment of the present invention, FIG. 2 is a plot representing the wave forms of input voltage and flux in the saturating reactor employed in accordance with the present invention, for a particular firing angle, FIG. 3 is an idealized plot of a rectangular hysteresis loop for the core of the saturating reactor employed with the present invention, FIG. 4 is a schematic diagram of a modification of the FIG. 1 embodiment, and FIG. 5 is a schematic diagram of the second embodiment in accordance with the present invention for supplying direct current to a load.

In the circuit of the present invention a controlled unilateral conductor, for example a silicon-controlled rectifier, has coupled substantially thereacross a saturating reactor. In accordance with a preferred form of the invention the unilateral conductor and the saturating reactor are disposed in a parallel circuit and together act as a phase adjustable nonlinear impedance between an alternating current supply and a load. The unilateral conductor is phase adjustable in a manner such that the initiation of current from the alternating current supply to the load is controlled to selected phase angles of the alternating supply voltage. The saturating reactor functions to substantially duplicate the action of the unilateral conductor on alternate half cycles.

Referring to FIG. 1, the parallel combination of a unilateral conductor, here a silicon-controlled rectifier 1, has an anode terminal 2, a cathode terminal 3 and a control terminal 4. The cathode and anode terminals have disposed thereacross the winding of a self-saturating reactor 5. The parallel combination of rectifier 1 and reactor 5 is disposed in series between alternating current supply terminals 6 and 7, and a load represented by resistor 8. Control leads 9 and 10 are supplied from a source (not shown) of phase adjustable voltage or a voltage pulse adjustable in phase relative to the waveform of the alternating current supply wave. The phase adjustable voltage occurs at a selected time during half cycles of input supply voltage when the rectifier 1 is capable of conduction and is of sufficient potential and current value for "firing" the rectifier. This signal is positive at lead 9 relative to lead 10, lead 9 being connected to control terminal 4 and lead 10 being connected to cathode terminal 3.

In operation, the circuit of FIG. 1 functions to provide bi-lateral phase adjustable controlled alternating current to the load 8 in accordance with the phase of the signal appearing between leads 9 and 10. When a signal between leads 9 and 10 fires rectifier 1, during a time when the AC supply voltage is positive at terminal 6 relative to terminal 7, current flows in load 8 for the remainder of the positive half cycle. During this time, the saturating reactor 5 provides a comparably large impedance and does not materially affect the current in load 8 since only exciting current flows in reactor 5. If rectifier 1 had not been fired by a control signal voltage, saturating reactor 5 would also pass only the very small exciting current during the ensuing negative half cycle. However, when the rectifier is fired at some instant during positive half cycle, the flux in reactor 5 at the instant of firing will have been reset to and is locked at a point on its operating hysteresis loop for the remainder of the half cycle so that it will fire at a corresponding point in the negative half cycle. The volt-time hold off period for the saturating reactor will be found to substantially duplicate the volt-time hold off period of the rectifier during the previous half cycle. A substantially equivalent amount of current is therefore delivered to load 8 during both positive and negative alternating current half cycles.

The operation of the FIG. 1 circuit is better understood by reference to the waveform diagram of FIG. 2. In FIG. 2, voltage across saturating reactor 5 and flux in the core of saturating reactor 5 are plotted vs. time. It is observed the flux lags the applied voltage by 90°. In this diagram it is assumed, for purposes of illustration, that the rectifier is fired after the first 90° of the positive alternating voltage cycle. The voltage across the saturating reactor is therefore reduced to a low value at the 90° point. The flux is also at a low value at this time and is locked at this low value.

After 180° of the input waveform, the voltage becomes negative, and since the rectifier does not conduct in this direction, this voltage appears across the saturating reactor. However at 270°, that is after 90° of the negative half cycle, the saturating reactor will fire in a manner mirroring the action of the rectifier in the positive half cycle, to drop the voltage thereacross to near zero and allow the passage of substantial current therethrough. This change in impedance or "firing" of the saturating reactor occurs because the saturating reactor has become saturated at this point whereby its impedance to the flow of current to the load is very small. As observed from the FIG. 2 plot, the flux in the reactor stays at its maximum point at this time and for the ensuing 90°.

The reason the saturating reactor thus mirrors the action of the rectifier in slaved relation is more clearly understood with reference to FIG. 3, illustrating an idealized rectangular hysteresis loop for the saturating reactor core material. This diagram plots flux density, B, vs. magnetomotive force, H, for the core of saturating reactor 5. Zero degrees in the FIG. 2 plot corresponds to point $u$ in the FIG. 3 diagram. After 90° of the input voltage, point $v$ is reached on the FIG. 3 plot.

Assuming for the moment that the rectifier 1 is not fired, the flux further increases in the positive direction (as also indicated by the lightly dashed flux curve past 90° in FIG. 2) reaching the upper portion of the hysteresis characteristic in FIG. 3 somewhat short of saturation. However, since in this illustration the rectifier is actually fired after 90° of the input waveform, the flux does not increase past point $v$ but remains at this value for the ensuing quarter cycle. Now, when 180° of the input voltage waveform has passed, a negative voltage is impressed upon the saturating reactor and the flux again increases in the negative direction around a minor hysteresis loop past a point $w$ in the FIG. 3 plot, reaching negative saturation at point $x$ after only 90° of the negative half cycle has passed. At this point the core saturates, thereby reducing the impedance of the reactor 5 to near zero, whereby the voltage thereacross drops substantially to zero as indicated, to pass substantial current to the load. In this manner the action of the rectifier during the positive half cycle is duplicated for the negative half cycle. The same action will occur at whatever angle the firing of the rectifier takes place. For example, assume the rectifier is fired after 45° of the input waveform, this corresponding to point $y$ on the hysteresis loop. Now the flux in the core of reactor 5 will remain more or less constant until a negative voltage appears thereacross, whereupon the flux will increase in a negative direction around a fore-shortened minor hysteresis loop past point $z$ to saturate near point $x$. The saturation is found to occur after only 45° of the negative half cycle, again mirroring the action of the rectifier.

In the plots of FIGS. 2 and 3, it is assumed for convenience of illustration that the knee of the magnetization curve occurs at slightly less than the peak of the flux change in the core due to the AC supply. It is only necessary that the knee of the magnetization curve should be higher than the peak flux in the core in the absence of the rectifier. Even though the hysteresis curve has a larger available peak-to-peak value, the operation of the saturating reactor will be found to seek the saturated condition for a portion of each negative half cycle corresponding to the portion of the positive half cycle in which the rectifier conducts. In the final analysis this action is caused by the direct current component of voltage across the unilateral conductor on positive half cycles whereby the saturating reactor operates to insure zero net DC voltage across the reactor.

It is desirable, although not necessary, that reactangular hysteresis loop material be used for the core of saturating reactor 5 whereby the saturated impedance of the reactor is suitably low for passing the maximum current to the load.

Several variations of the circuit are of course possible without departing from the spirit of the present invention. Although a silicon-controlled rectifier is preferred because of its economy of cost and space, as well as for its rapid response time, other unilateral conductors such as thyratron gaseous tubes may be used. Moreover, although the circuit is illustrated as supplying a load in a series circuit, it is equally feasible to control a load in parallel with the phase adjustable control circuit in accordance with the present invention. Such a parallel load is illustrated by reference numeral 8a in FIG. 1 of the present application. This parallel shunting or diverting arrangement has found particular utility in combination with fluorescent lighting ballast apparatus for light dimming as further described and claimed in my concurrently filed application, Serial No. 243,833, and now Patent No. 3,222,573, issued Dec. 7, 1965 and assigned to the assignee of the present invention.

An alternative and advantageous arrangement for the control circuit is illustrated in FIG. 4. This circuit is identical to the FIG. 1 embodiment as regards like elements referred to with like reference numerals. The difference resides in the manner in which the parallel combination of controlled rectifier and saturating reactor are coupled together. In the embodiment of FIG. 4 the rectifier has its anode and cathode terminals tapped across a portion of the saturating reactor 5. This circuit finds particular utility when the peak supply voltage is high compared to the peak voltage rating of the rectifier. The saturating reactor in this instance performs the dual function of converting the half wave control action of the controlled rectifier into full wave control action and that of reducing the peak voltage requirements of the controlled rectifier, the saturating reactor functioning as an auto-transformer.

Referring now to FIG. 5, there is shown a direct current output embodiment of my invention incorporating a different circuit for coupling saturating reactor 5 for resetting purposes to the controlled unilateral conductor or rectifier 1. In the FIG. 5 circuit the slaved reactor 5 is provided with a magnetic saturation control winding 11 and is connected to receive a reset signal voltage proportional to the voltage developed across the silicon-controlled rectifier.

A bi-phase transformer 13 supplies load 8 through a pair of secondary terminals, one terminal being connected to the load via rectifier 1, and the other being connected to the load via saturating reactor 5. Load 8 is directly connected between the cathode terminal of the rectifier and the secondary center tap 12 of bi-phase input transformer 13 while a diode 17 is interposed between reactor 5 and the load to form a bi-phase DC rectifier circuit.

The saturating reactor controlling signal is developed by connecting winding 11 in series with a half wave voltage generating circuit comprising a tertiary winding 14 of transformer 13, rectifier 15 and a resistor 16. This half wave voltage generating circuit is connected in series with load 8 and thus supplies composite voltage signals to saturating reactor control winding 11; the voltage is equal to the half cycle voltage pulse seen across resistor 16, minus the voltage developed across load 8 as a result of load current therethrough. Tertiary winding 14 and rectifier 15 are polarized such that a half wave of current flows through resistor 16 during the same half cycle that rectifier 1 may deliver current to load 8. This load voltage wave is instantaneously subtracted from the sinusoidal half cycle of voltage developed across the load 8 such that control winding 11 receives a reset voltage during this period appropriate for resetting the saturating reactor 5. Winding 11 resets the core of reactor 5 before the rectifier 1 conducts. This resetting terminates when rectifier 1 fires, producing a voltage across load 8. The load 8 voltage is larger than the voltage across the tertiary winding 14 and therefore rectifier 15 blocks the flow of any further current to winding 11.

While I have shown and described several embodiments of my invention, it will be apparent to those skilled in the art that many changes and modifications may be without departing from my invention in its broader aspects; and I therefore intend the appended claim to cover all such changes and modifications as fall within the true spirit and scope of my invention.

What I claim as new and desire to secure by Letters Patent of the United States is:

A phase adjustable control circuit for providing full wave output unidirectional current to a load comprising: a bi-phase transformer including a primary for receiving an alternating current input, a secondary having first and second terminals and having a center tap lead for providing a common return for said load, and having a tertiary winding; a controlled unilateral conductor coupled between one of said terminals and said load; a saturating reactor having a principal winding coupled between said second terminal and said load, and having a control winding; a rectifier also coupled between said second terminal and said load in series with said principal winding; a saturating reactor control circuit for applying a voltage developed from said tertiary winding to said control winding for resetting said saturating reactor; and means for terminating the resetting of the saturating reactor in response to initiation of conduction of the controlled unilateral conductor.

References Cited

UNITED STATES PATENTS

| | | | |
|---|---|---|---|
| 2,054,496 | 9/1936 | Craig | 323—86 |
| 3,018,383 | 1/1962 | Ellert | 307—88.5 |
| 3,076,925 | 2/1963 | Jackson | 307—88.5 |
| 3,128,440 | 4/1964 | Davis | 323—56 X |
| 3,136,941 | 6/1964 | Marlow | 323—89 |

OTHER REFERENCES

Glasberg, M.: Silicon Controlled Rectifiers. In Electro-Mechanical Components and Systems Design, vol. 6, March 1962, pp. 19 and 23.

JOHN F. COUCH, *Primary Examiner.*

J. M. THOMSON, W. M. SHOOP, Jr., K. D. MOORE,
*Assistant Examiners.*